(12) United States Patent
Dang et al.

(10) Patent No.: US 10,416,675 B2
(45) Date of Patent: Sep. 17, 2019

(54) LINE ACQUISITION PATH GENERATION USING CURVATURE PROFILES

(71) Applicant: AGJUNCTION LLC, Hiawatha, KS (US)

(72) Inventors: Tri M. Dang, Durack (AU); Timothy J. Sullivan, Kedron (AU); Eran D. B. Medagoda, Morningside (AU)

(73) Assignee: AGJUNCTION LLC, Hiawatha, KS (US)

( * ) Notice: Subject to any disclaimer, the term of this patent is extended or adjusted under 35 U.S.C. 154(b) by 0 days.

(21) Appl. No.: 15/483,524

(22) Filed: Apr. 10, 2017

(65) Prior Publication Data

US 2017/0293304 A1  Oct. 12, 2017

Related U.S. Application Data

(60) Provisional application No. 62/321,393, filed on Apr. 12, 2016.

(51) Int. Cl.
  *G05D 1/02* (2006.01)
  *A01B 69/04* (2006.01)
  (Continued)

(52) U.S. Cl.
  CPC ......... *G05D 1/0212* (2013.01); *A01B 69/006* (2013.01); *A01B 69/008* (2013.01);
  (Continued)

(58) Field of Classification Search
  CPC .... G05D 1/0212; G05D 1/0088; G05D 1/021; G05D 1/0278; G05D 2201/0201; A01B 69/008; B62D 6/002
  See application file for complete search history.

(56) References Cited

U.S. PATENT DOCUMENTS

| 5,194,851 | A | | 3/1993 | Kraning et al. |
| 5,375,059 | A | * | 12/1994 | Kyrtsos ............ B60K 31/0008 342/357.24 |

(Continued)

OTHER PUBLICATIONS

Noh, Kwang-Mo, Self-tuning controller for farm tractor guidance, Iowa State University Retrospective Theses and Dissertations, Paper 9874, (1990).

(Continued)

*Primary Examiner* — Behrang Badii
*Assistant Examiner* — Daniel L Greene
(74) *Attorney, Agent, or Firm* — Schwabe Williamson & Wyatt

(57) ABSTRACT

A line acquisition system generates a curvature profile based on initial vehicle states (starting position, heading, curvature and speed), vehicle steering capabilities (calibrated vehicle curvature and curvature rate limits), and initial vehicle position errors relative to the destination path. The curvature profile describes changes in vehicle curvature over a path distance from a current position to a destination path. The line acquisition system constructs an acquisition path from a combination of clothoid, circular arc, and straight lines corresponding with different segments of the curvature profile. The acquisition path can be displayed on a user interface allowing a vehicle operator to observe, prior to automatic steering engagement, the path the vehicle would take from a current state to the destination path.

20 Claims, 19 Drawing Sheets

(51) Int. Cl.
*G01C 21/20* (2006.01)
*G05D 1/00* (2006.01)
*B62D 6/00* (2006.01)
*B62D 15/02* (2006.01)
*A01B 69/08* (2006.01)

(52) U.S. Cl.
CPC ........... *B62D 6/002* (2013.01); *B62D 15/029* (2013.01); *G01C 21/20* (2013.01); *G05D 1/0088* (2013.01); *G05D 1/021* (2013.01); *G05D 1/0278* (2013.01); *G05D 2201/0201* (2013.01)

(56) References Cited

U.S. PATENT DOCUMENTS

| | | | |
|---|---|---|---|
| 5,390,125 | A | 2/1995 | Sennott et al. |
| 5,555,503 | A * | 9/1996 | Kyrtsos .................. G01S 19/11 342/357.24 |
| 5,663,879 | A | 9/1997 | Trovato et al. |
| 5,923,270 | A | 7/1999 | Sampo et al. |
| 6,052,647 | A | 4/2000 | Parkinson et al. |
| 6,070,673 | A | 6/2000 | Wendte |
| 6,212,453 | B1 | 4/2001 | Kawagoe et al. |
| 6,373,432 | B1 | 4/2002 | Rabinowitz et al. |
| 6,377,889 | B1 | 4/2002 | Soest |
| 6,445,983 | B1 | 9/2002 | Dickson et al. |
| 6,539,303 | B2 | 3/2003 | McClure et al. |
| 6,711,501 | B2 | 3/2004 | McClure et al. |
| 6,789,014 | B1 | 9/2004 | Rekow et al. |
| 6,819,780 | B2 | 11/2004 | Benson et al. |
| 6,865,465 | B2 | 3/2005 | McClure |
| 6,876,920 | B1 | 4/2005 | Mailer |
| 7,142,956 | B2 | 11/2006 | Heiniger et al. |
| 7,162,348 | B2 | 1/2007 | McClure et al. |
| 7,277,792 | B2 | 10/2007 | Overschie |
| 7,373,231 | B2 | 5/2008 | McClure et al. |
| 7,400,956 | B1 | 7/2008 | Feller et al. |
| 7,437,230 | B2 | 10/2008 | McClure |
| 7,460,942 | B2 | 12/2008 | Mailer |
| 7,689,354 | B2 | 3/2010 | Heiniger et al. |
| RE41,358 | E | 5/2010 | Heiniger et al. |
| 7,835,832 | B2 | 11/2010 | Macdonald et al. |
| 7,885,745 | B2 | 2/2011 | McClure et al. |
| 8,018,376 | B2 | 9/2011 | McClure et al. |
| 8,190,337 | B2 | 5/2012 | McClure |
| 8,214,111 | B2 | 7/2012 | Heiniger et al. |
| 8,311,696 | B2 | 11/2012 | Reeve |
| 8,386,129 | B2 | 2/2013 | Collins et al. |
| 8,401,704 | B2 | 3/2013 | Pollock et al. |
| 8,489,291 | B2 | 7/2013 | Dearborn et al. |
| 8,521,372 | B2 | 8/2013 | Hunt et al. |
| 8,548,649 | B2 | 10/2013 | Guyette et al. |
| 8,583,315 | B2 | 11/2013 | Whitehead et al. |
| 8,583,326 | B2 | 11/2013 | Collins et al. |
| 8,589,013 | B2 | 11/2013 | Pieper et al. |
| 8,594,879 | B2 | 11/2013 | Roberge et al. |
| 8,634,993 | B2 | 1/2014 | McClure et al. |
| 8,639,416 | B2 | 1/2014 | Jones et al. |
| 8,649,930 | B2 | 2/2014 | Reeve et al. |
| 8,676,620 | B2 | 3/2014 | Hunt et al. |
| 8,718,874 | B2 | 5/2014 | McClure et al. |
| 8,768,558 | B2 | 7/2014 | Reeve et al. |
| 8,781,685 | B2 | 7/2014 | McClure |
| 8,803,735 | B2 | 8/2014 | McClure |
| 8,897,973 | B2 | 11/2014 | Hunt et al. |
| 8,924,152 | B2 | 12/2014 | Hunt et al. |
| 9,002,565 | B2 | 4/2015 | Jones et al. |
| 9,002,566 | B2 | 4/2015 | McClure et al. |
| 9,141,111 | B2 | 9/2015 | Webber et al. |
| 9,162,703 | B2 | 10/2015 | Miller et al. |
| 9,173,337 | B2 | 11/2015 | Guyette et al. |
| 9,223,314 | B2 | 12/2015 | McClure et al. |
| 9,255,992 | B2 | 2/2016 | McClure |
| 9,389,615 | B2 | 7/2016 | Webber et al. |
| 2002/0072850 | A1 | 6/2002 | McClure et al. |
| 2003/0101036 | A1* | 5/2003 | Nagel .................... G01C 21/32 703/13 |
| 2004/0186644 | A1* | 9/2004 | McClure ............. A01B 69/008 701/50 |
| 2006/0167600 | A1 | 7/2006 | Nelson, Jr. et al. |
| 2009/0326763 | A1 | 12/2009 | Rekow |
| 2010/0084147 | A1* | 4/2010 | Aral ..................... A01B 69/004 172/1 |
| 2010/0274452 | A1 | 10/2010 | Ringwald et al. |
| 2014/0266877 | A1 | 9/2014 | McClure |
| 2014/0277676 | A1 | 9/2014 | Gattis |
| 2015/0175194 | A1 | 6/2015 | Gattis |
| 2015/0342110 | A1* | 12/2015 | Peake .................. A01B 79/005 701/50 |
| 2016/0039454 | A1 | 2/2016 | Mortimer |
| 2016/0154108 | A1 | 6/2016 | McClure et al. |
| 2016/0205864 | A1 | 7/2016 | Gattis et al. |
| 2016/0214643 | A1 | 7/2016 | Joughin et al. |
| 2016/0252909 | A1 | 9/2016 | Webber et al. |
| 2016/0313737 | A1* | 10/2016 | Berkemeier ......... G05D 1/0212 |
| 2016/0334804 | A1 | 11/2016 | Webber et al. |
| 2018/0208199 | A1 | 7/2018 | Fujita |

OTHER PUBLICATIONS

Van Zuydam, R.P., Centimeter-Precision Guidance of Agricultural Implements in the Open Field by Means of Real Tim Kinematic DGPS, ASA-CSSA-SSSA, pp. 1023-1034 (1999).
International Search Report and Written Opinion of International Application No. PCT/US17/26780, dated Aug. 30, 2017, pp. 1-20.
International Preliminary Report on Patentability; PCT/US17/26780, dated Oct. 25, 2018, pp. 1-12.

* cited by examiner

DYNAMICALLY GENERATED ACQUISITION PATHES

LINE ACQUISITION PATH GENERATION USING CURVATURE PROFILES

The present application claims priority to U.S. Provisional Patent Application Ser. No. 62/321,393 filed on Apr. 12, 2016, entitled: LINE ACQUISITION PATH GENERATION which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to generating acquisition paths using curvature profiles.

BACKGROUND

A control system may automatically steer a vehicle from a current location to a destination path, such as a way-line on a field. The path taken by the vehicle to the destination path is determined on the fly based on the nature of the vehicle's automatic steering control system and the position of the vehicle relative to the destination path. The control system continuously adjusts the direction of the vehicle as the vehicle moves closer to the destination path. In other words, the steering controller does not know the acquisition path taken by the vehicle until actually reaching and acquiring the destination path.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1:
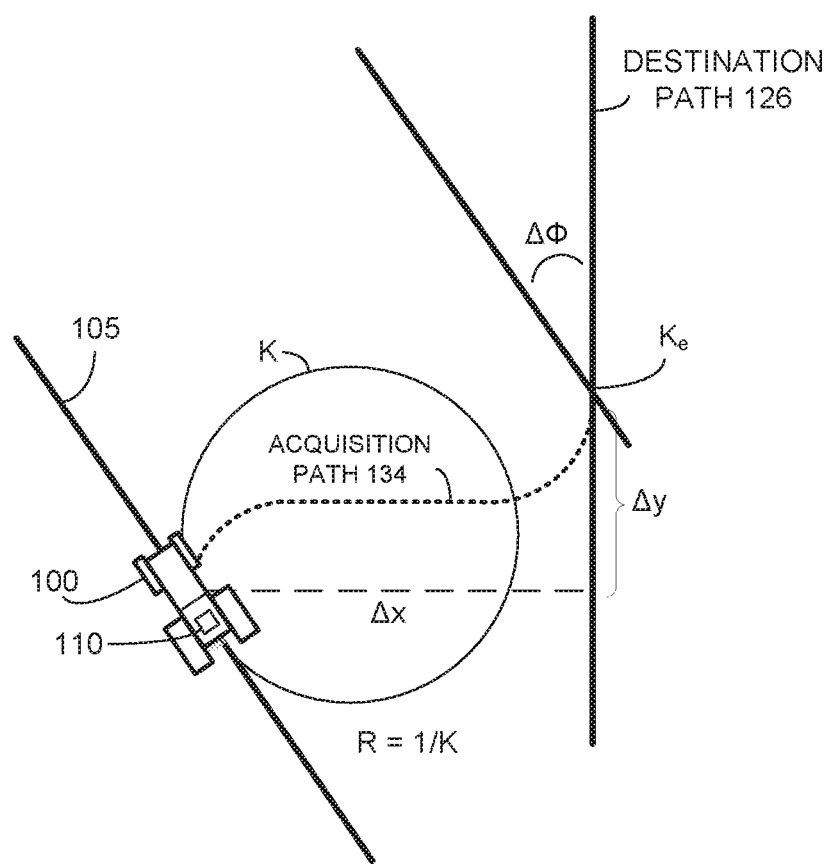
FIG. 1 shows example parameters taken into account when generating an acquisition path.

A line acquisition system determines an acquisition path from a current location of a vehicle onto a destination path using initial vehicle states (starting position, heading, curvature and speed), vehicle steering capabilities (calibrated vehicle curvature and curvature rate limits), and initial vehicle position errors relative to the destination path. The line acquisition system uses the vehicle states to generate a curvature profile. The curvature profile describes changes in vehicle curvature over a path distance from a current position to the destination path. The line acquisition system constructs the acquisition path from the calculated curvature profile.

The acquisition path can be displayed on a user interface allowing a vehicle operator to observe, prior to automatic steering engagement, the path the vehicle would take from a current state to the destination path. From an agricultural perspective, the acquisition path provides the user with a description of where the vehicle will drive when acquiring a destination path, such as a way-line in a field. The operator can engage an automatic steering system to steer the vehicle along the predicted acquisition path.

Knowledge of the acquisition path has wide implications, ranging from better management of field operations between paths and headlands, the ability to plan vehicle tasks based on the vehicle's current position on the acquisition path, as well as the creation of a robust automatic steering controller that no longer has to contend with uncertain acquisition conditions.

The acquisition path provides the user with a complete drivable path from the vehicle's current position to the destination path. This increases user situational awareness for improved decision making. The user can decide the best time to engage the automatic steering controller, with knowledge that the acquisition path driven by the vehicle will avoid hazards and other areas of the field.

The line acquisition system may increase levels of vehicle autonomy. For example, with a complete computed acquisition path, the user may have fewer steering tasks to perform when processing a field, such as manually steering the vehicle to a suitable position near the destination path before engaging the automatic steering controller. The line acquisition system also may enable automatic end-of-row turns that reduce the amount of manual steering when transitioning between different destination paths and ultimately reducing user workload.

Providing a complete line acquisition path from the vehicle's current position to the destination path may improve automatic steering controller designs. For example, the vehicle may no longer need to perform certain acquisition maneuvers onto the destination path and the steering controller may no longer need to process large controller inputs, such as large cross-track and heading errors. The steering controller can therefore maintain tighter tracking control when positioned on the destination path, since the vehicle may be in-line with the acquisition and destination paths from the moment of automatic steering control engagement.

Predicting acquisition paths also may allow the steering controller to accommodate a greater number of engagement conditions that may otherwise be rejected. These cases may occur when the current state of the vehicle relative to the destination path exceeds controller steering constraint limits.

FIG. 1 shows geometries used for generating a curvature profile and subsequent acquisition path 134. A control system 110 located on a vehicle 100 may include a steering controller for automatically steering vehicle 100. For example, control system 110 may be located on a tractor 100 and used for automatically steering tractor 100 over a destination path 126, such as way-lines aligned with rows in a field. Control system 110 may automatically steer vehicle 100 over destination path 126 while vehicle 100 plows, seeds, sprays, unloads, or the like, or any combination thereof. Of course, this is just an example and control system 110 may steer any type of vehicle 100 over any type of destination path 126.

Control systems that automatically steer agricultural vehicles using GPS/INS technology over destination paths are described in U.S. Pat. No. 7,142,956, issued Nov. 28, 2006, entitled: AUTOMATIC STEERING SYSTEM AND METHOD; U.S. Pat. No. 7,689,354, issued Mar. 30, 2010, entitled ADAPTIVE GUIDANCE SYSTEM AND METHOD; U.S. Pat. No. 7,835,832, Nov. 16, 2010, entitled: VEHICLE CONTROL SYSTEM; and U.S. Pat. No. 7,437,230, issued Oct. 14, 2008, entitled: SATELLITE BASED VEHICLE GUIDANCE CONTROL IN STRAIGHT AND CONTOUR MODES, which are all herein incorporated by reference in their entireties.

Vehicle 100 may be located on a current path 105 with a cross-track error $\Delta x$ and heading error $\Delta\Phi$ relative to destination path 126. The vehicle operator may engage control system 110 to automatically steer vehicle 100 onto destination path 126. Prior control systems may start generating commands that start steering vehicle 100 toward destination path 126 and then repeatedly recalculate new steering commands based on a next measured position of vehicle 100. In these previous systems, the control system never pre-determines the entire acquisition path 134 from a current location of vehicle 100 to destination path 126. Thus, the vehicle operator never knows if activating the automatic steering system may cause vehicle 100 to travel over an undesirable acquisition path 134, such as one with obstructions.

Control system 110 generates a curvature profile for deriving a complete acquisition path 134 from the current vehicle location to destination path 126. Control system 100 may display the acquisition path 134 on a user interface. The vehicle operator can visually confirm acquisition path 134 avoids obstructions and that acquisition path 134 acquires destination path 126 at the correct acquisition point and heading. The vehicle operator can then activate an automatic steering controller in control system 110 to automatically steer vehicle 100 along acquisition path 134 and automatically acquire destination path 126.

Vehicle 100 may have initial vehicle states where:
K is an initial vehicle curvature;
R is the radius of the curvature K;
$\Delta x$ is an initial vehicle lateral cross-track error with respect to the destination path 126;
$\Delta\Phi$ is an initial vehicle heading error with respect to destination path 126;
$K_e$ is a curvature at a landing position on destination path 126 (Ke=0);
$\Delta y$ is a longitudinal distance along destination path 126 from a point nearest to the initial vehicle position to the landing position;
Kmax is a curvature limit representing a maximum amount of left or right turn for vehicle 100; and
$\dot{K}$max is a curvature rate limit representing how quickly vehicle 100 can steer to the maximum curvature limit.

The information above is used to generate a curvature profile, which describes the change of the path curvature over the path distance used by vehicle 100 to transit from a current position to destination path 126. Controller 110 constructs acquisition path 134 from the calculated curvature profile.

By definition the curvature of a plane curve is the rate of change of the curve heading over the curve path distance:

$$K = \frac{d\Phi}{dS} \qquad (1)$$

where K is the curvature, $\Phi$ is the heading and S is the curve path distance From equation 1 the heading change over a distance S is:

$$\Phi = \int_0^S K dS. \qquad (2)$$

Equation 2 indicates that the overall heading change on a path is equal the area under its curvature vs. distance graph. The path heading on any segment of the path will not change if the curvature is 0.

The curvature profile of a path is its curvature vs distance graph. If the value of left/right curvature limits and the curvature rate $$\frac{dK}{dS}$$

of vehicle 100 known constants, a curvature profile can be generated that produces the necessary heading change. Moreover, if the curvature profile has a segment of zero curvature, the profile can be "stretched" along the path distance axis along that segment without changing the area under it and disrupting the heading change requirement. Control system 110 may build curvature profiles based on the above mentioned properties.

In one example, control system 110 builds curvature profiles from two sections with a joining point of zero curvature in-between. A path heading at the zero curvature point is alternatively referred to as an attack heading. The first section of the curvature profile changes the heading of vehicle 100 from its starting value to the attack heading. The attack heading moves the vehicle closer to destination path 126. The second section changes the heading of vehicle 100 from the attack heading to the heading of destination path 126.

Figure 2:
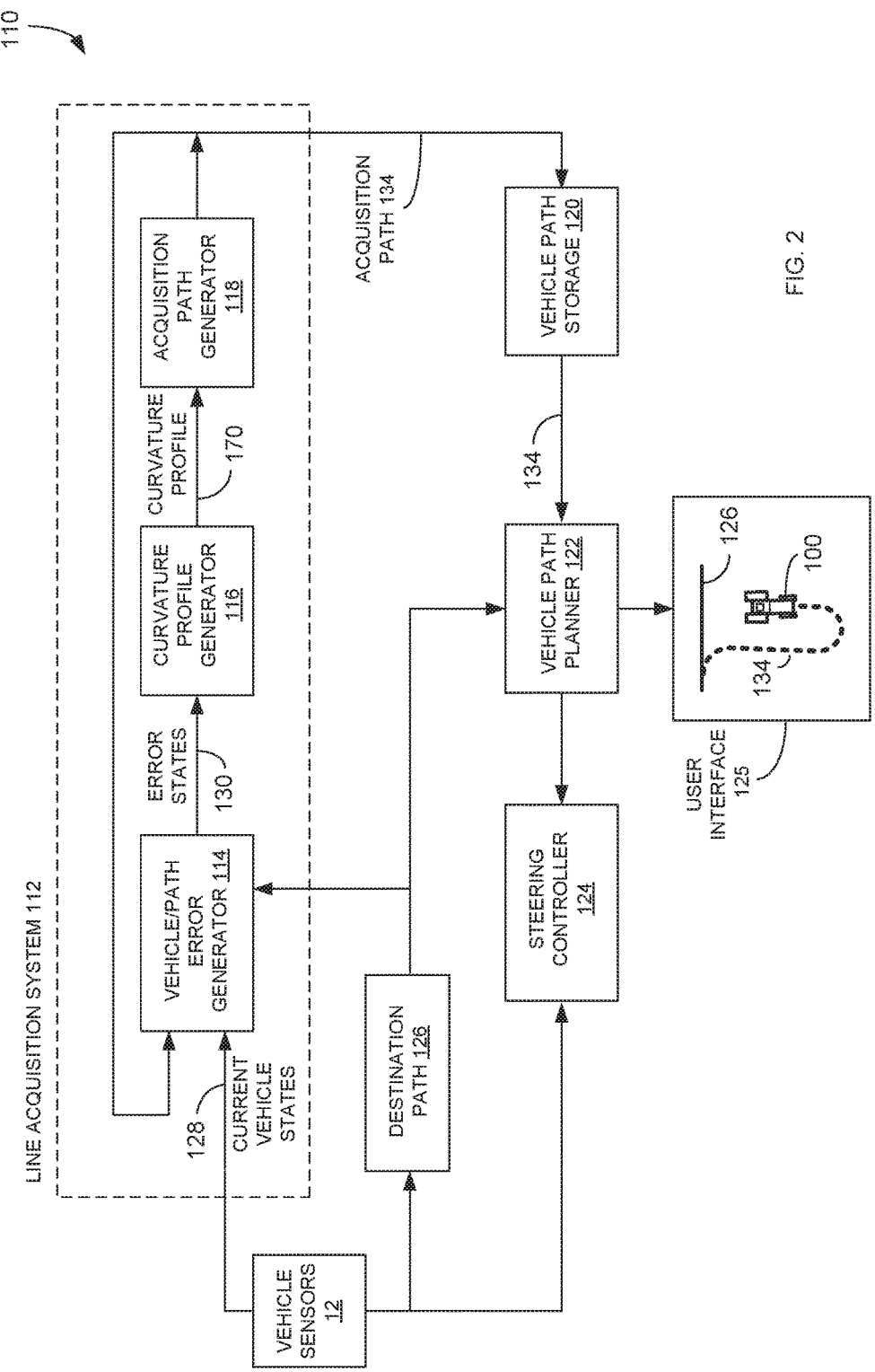
FIG. 2 shows example control system that generates curvature profiles and associated acquisition paths.

FIG. 2 shows a line acquisition system 112 that operates as part of vehicle control system 110. Line acquisition system 112 generates vehicle curvature profiles 170 based on current states 128 of vehicle 100 relative to destination path 126 as described above. Vehicle curvature profiles 170 produce a drivable acquisition path 134 for automatically steering vehicle 100 from current vehicle state 128 onto destination path 126.

Destination path 126 may be electronically created and stored in memory. As explained above, destination path 126 may include one or more way-lines for a field selected by the vehicle operator. For example, control system 110 may detect a current vehicle position from vehicle sensors 12 including a global positioning system (GPS) and an inertial measurement unit (IMU). Control system 110 uses vehicle sensors 12 to determine positions of vehicle 100 while traveling along a row in the field and then stores the positions as destination path 126.

Line acquisition system 112 may include a vehicle/path error generator 114 that receives destination path 126 and current vehicle states 128 of vehicle 100. At a current time, error generator 114 determines error states 130 of vehicle 100 with respect to destination path 126. For example, error generator may determine a heading error between vehicle 100 and destination path 126. A curvature profile generator 116 calculates a curvature profile 170 that eliminates the heading error between vehicle 100 and destination path 126. For example, as explained above, profile generator 116 may generate a curvature profile 170 with a curvature vs. distance graph area that produces the necessary heading change to remove the heading error.

An acquisition path generator 118 converts curvature profile 170 into a drivable acquisition path 134 for vehicle 100. The end position of the acquisition path 134 is fed back into error generator 114. If the cross track error is greater than a predetermined threshold, curvature profile generator 116 generates a new vehicle curvature profile 170. For example, curvature profile generator 116 may adjust curvature profile 170 when the endpoint of acquisition path 134 is short or overshoots destination path 126.

Acquisition path generator 118 generates a new acquisition path 134 from the new curvature profile 170. The end position of the new acquisition path 134 is again fed into error generator 114. The acquisition path 134 is stored in memory 120 and sent to a vehicle path planner 122 when the cross track error of the end position is within the predetermined threshold. Vehicle path planner 122 may display acquisition path 134 on user interface 125. The vehicle operator may engage a steering controller 124 when the displayed acquisition path 134 converges with destination path 126 at an acceptable acquisition point and does not cross over obstructions.

In response to the user selecting acquisition path 134, vehicle path planner 122 may combine acquisition path 134 with destination path 126. Vehicle path planner 122 then sends the combined paths 134 and 126 to steering controller 124. Steering controller 124 uses navigation information, such as GPS and inertial data from vehicle sensors 12, to steer vehicle 100 along acquisition path 134 and onto destination path 126.

Curvature Profiles

Figure 3A:
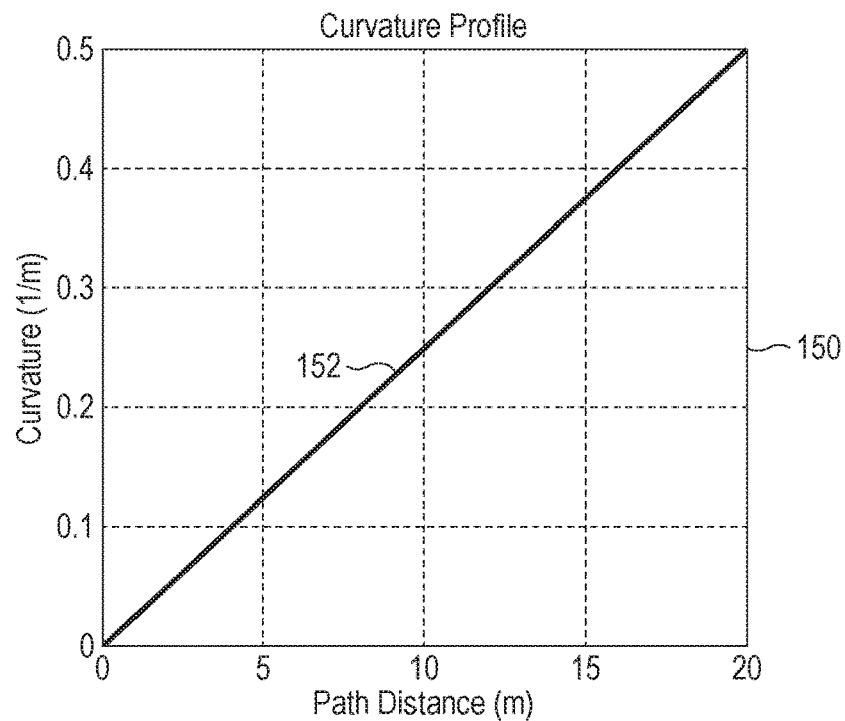
FIGS. 3A and 3B show an example clothoid segment of a curvature profile.
Figure 3B:
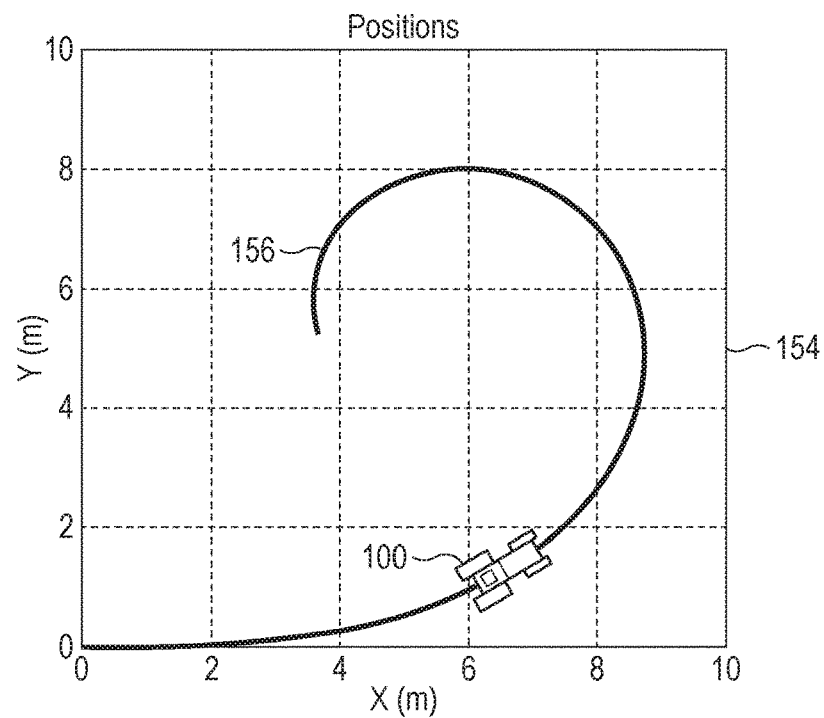

FIGS. 3A and 3B show an example curvature profile segment for a clothoid path. FIG. 3A shows a graph 150 with an x-axis representing a path distance in meters (m) and a y-axis representing a curvature for vehicle 100. FIG. 3B shows a graph 154 with a x-axis representing a x position of vehicle 100 and a y-axis representing a y position of vehicle 100. Curvature profile segment 152 in FIG. 3A produces steering path 156 of vehicle 100 in FIG. 3B.

Curvature profile segment 152 represents a vehicle curvature starting at zero and linearly increasing to 0.5 at 20 meters. In one example, curvature profile 152 represents turning the wheels of vehicle 100 as far as possible to the left while vehicle 100 travels over the path distance at a given speed. FIG. 3B shows a clothoid path 156 taken by vehicle 100 based on curvature profile segment 152. Clothoid path 156 has a curvature that changes proportionally with path length.

Figure 4A:
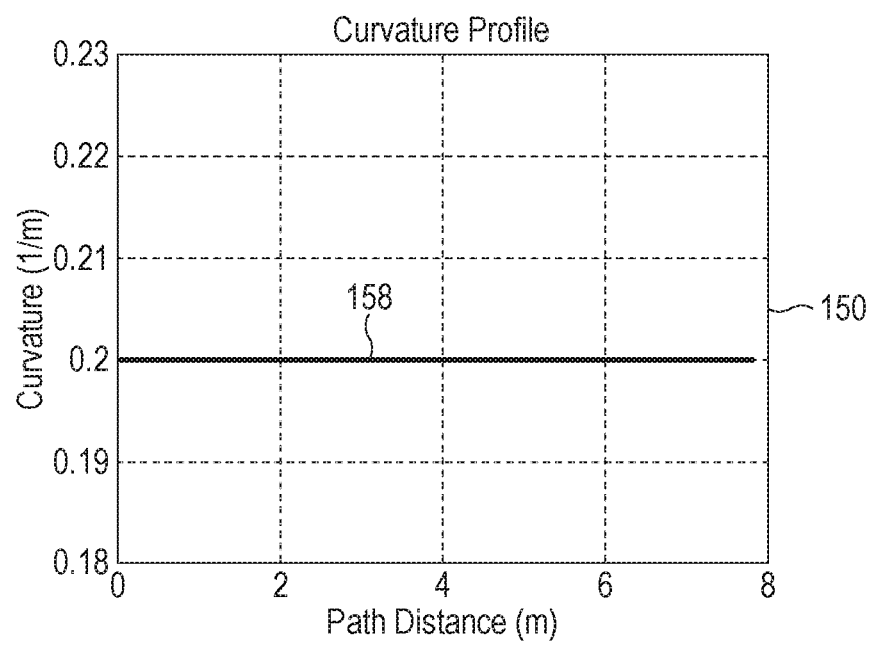
FIGS. 4A and 4B show an example circular arc segment of a curvature profile.
Figure 4B:
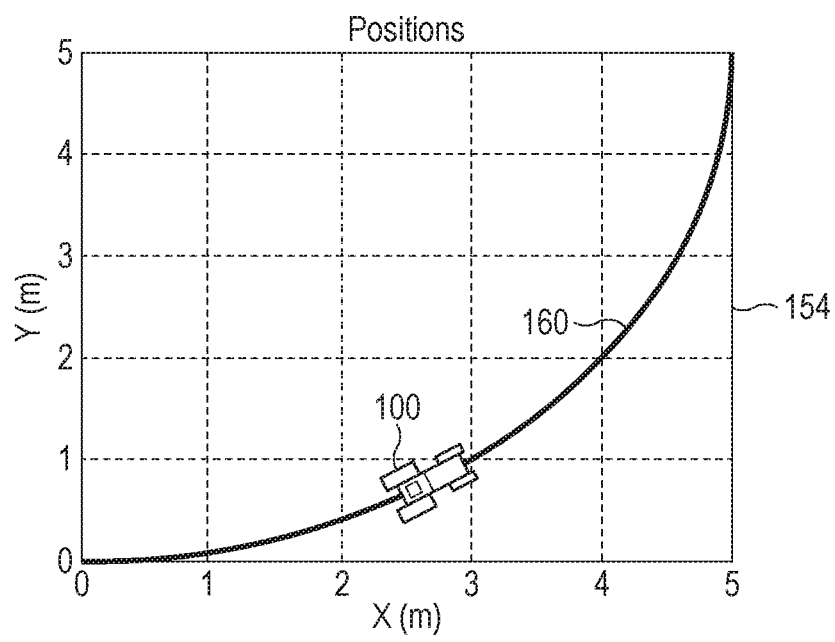

FIGS. 4A and 4B show an example curvature profile segment for a circular arc. FIG. 4A again shows a graph 150 with an x-axis representing a path distance in meters (m) and y-axis representing curvature for vehicle 100. FIG. 4B again shows position graph 154 with x-axis representing an x position of vehicle 100 and a y-axis representing a y position of vehicle 100.

Curvature profile segment 158 in FIG. 4A produces steering path 160 of vehicle 100 in FIG. 4B. Curvature profile segment 158 is parallel with the x-axis and represents a constant non-zero vehicle curvature. Curvature profile segment 158 produces a circular arc path 160 with a curvature that remains constant with path length.

Figure 5A:
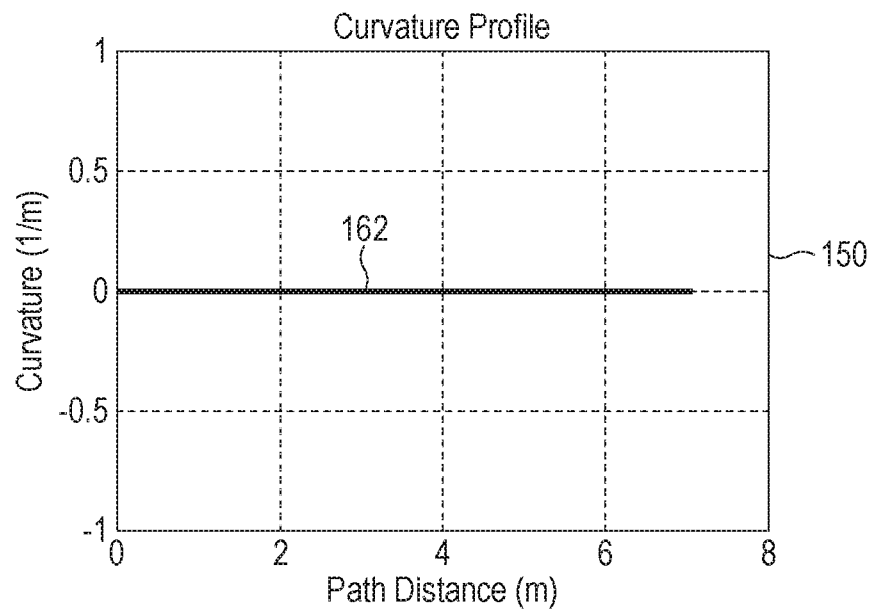
FIGS. 5A and 5B show an example zero-curvature segment of a curvature profile.
Figure 5B:
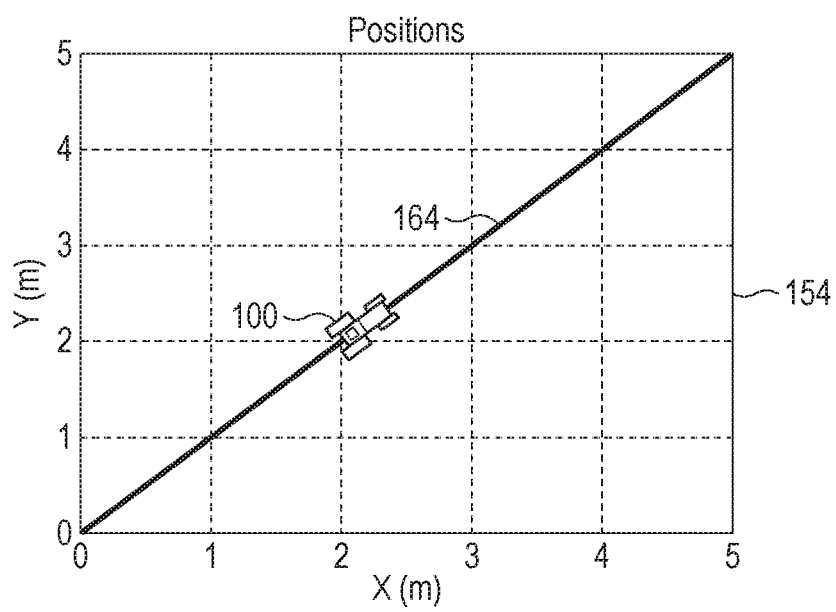

FIGS. 5A and 5B show an example curvature profile segment for a zero-curvature straight line. FIG. 5A again shows graph 150 with an x-axis representing a path distance in meters (m) and a y-axis representing a curvature for vehicle 100. FIG. 5B again shows graph 154 with x-axis representing an x position of vehicle 100 and a y-axis representing a y position of vehicle 100.

Curvature profile segment 162 has a constant zero curvature for its entire length. Profile segment 162 causes vehicle 100 to travel along a straight line path 164 with zero curvature. For example, vehicle 100 travels from a zero x,y location to 5,5 meter x,y location in a straight line path 164.

Figure 6A:
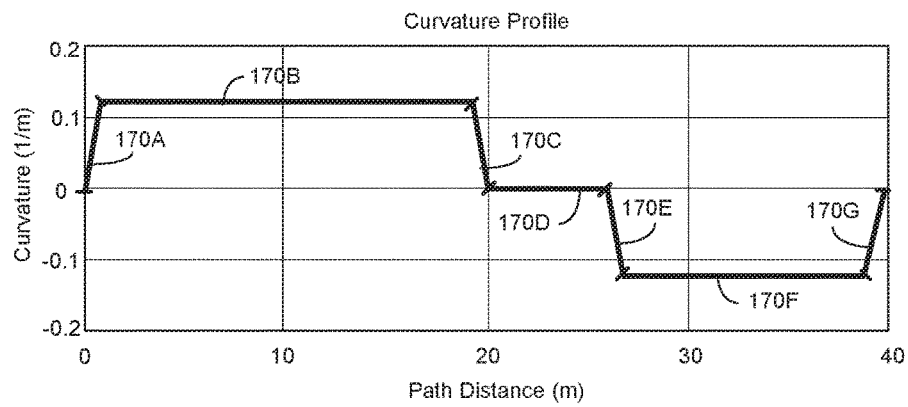
FIGS. 6A-6C show an example curvature profile and resulting heading and acquisition path.
Figure 6B:
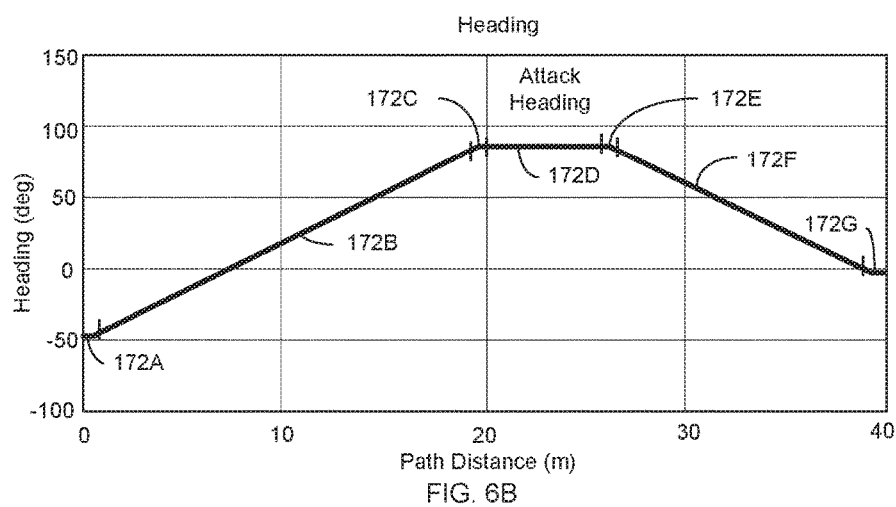
Figure 6C:
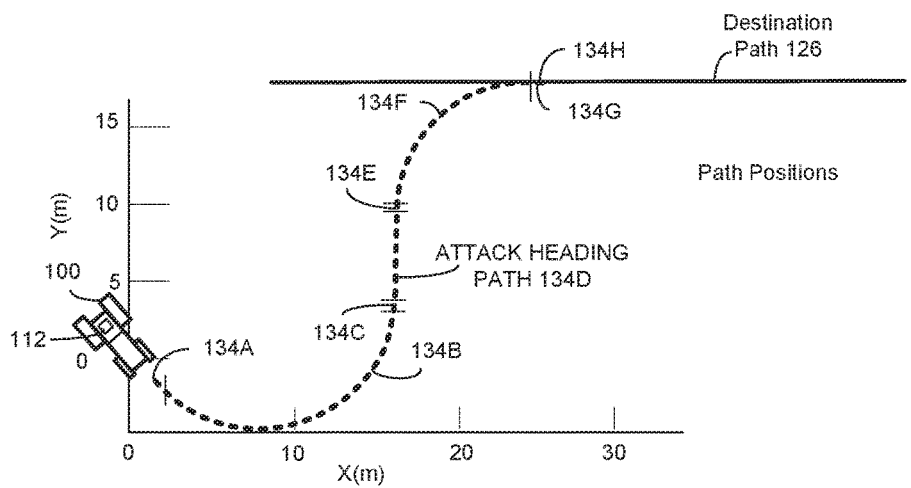

FIGS. 6A shows how line acquisition system 112 combines curvature profile segments 152 in FIG. 3A, 158 in FIG. 4A, and 162 in FIG. 5A to generate an example complex curvature profile 170. FIG. 6B shows an example complex heading profile and FIG. 6C shows an example acquisition path 134 built from the curvature profile in FIG. 6A.

FIG. 6A includes a curvature profile graph with an x-axis representing a path distance in meters and a y-axis representing vehicle curvature. FIG. 6B includes a heading graph with an x-axis representing vehicle path distance and a y-axis representing a heading of vehicle 100 relative to destination path 126 in degrees. FIG. 6C includes a path position graph with an x-axis representing an x position of vehicle 100 and a y-axis representing a y position of vehicle 100.

The line acquisition system 112 uses error generator 114 in FIG. 2 to determine a heading error from a current position of vehicle 100 to destination path 126. Line acquisition system 112 then starts searching for an attack heading value in the range of $[\pi/2, -\pi/2]$ starting from $\pi/2$. For example, vehicle 100 may be traveling in a straight forward direction parallel and to the left of destination path 126. Turning 90 degrees to the right would move vehicle 100 into a perpendicular 90 degree attack heading towards destination path 126. In another example, vehicle may be angled at 45 degrees toward destination path 126. Turning 45 degrees would move vehicle 100 into the 90 degree attack heading toward destination path 126. The 90 degree attack heading may produce a shortest acquisition path 134 to destination path 126. However, line acquisition system 112 may use other attack headings as described in more detail below.

Line acquisition system 112 builds curvature profile 170 based on the vehicle's steering curvature limits, steering curvature rate, the selected attack heading, and the heading error of vehicle 100 with respect to destination path 126. In this example, line acquisition system 112 derives three curvature profile segments 170A, 170B, and 170C that change vehicle 100 from a current heading 172A of −50 degrees to an attack heading 172D of 90 degrees relative to destination path 126.

Curvature segment 170A may produce a clothoid vehicle path section 134A that turns vehicle 100 as quickly as possible to the left that creates vehicle heading change 172A. Curvature profile segment 170B produces a circular arc vehicle path section 134B where vehicle 100 maintains a constant left curvature and creates heading change 172B.

Curvature profile segment 170C produces another clothoid vehicle path section 134C that moves vehicle 100 into a zero curvature and a heading change 172C 90 degrees to destination path 126. Curvature profile segment 170D maintains vehicle 100 along straight zero-curvature vehicle path 134D with a constant 90 degree attack heading 172D toward destination path 126.

Curvature profile segments 170E, 170F, and 170G produce a right turn for vehicle 100 onto destination path 126. For example, curvature segment 170E produces a clothoid vehicle path 134E where vehicle heading 172E starts dropping from 90 degrees toward zero degrees. Curvature profile segment 170F produces circular arc path 134F and a linear heading change 172F. Curvature profile segment 170G produces another clothoid vehicle path 134G that straightens the wheels of vehicle 100 onto destination path 126 along zero degree heading 172G.

Line acquisition system 112 compares an end position 134H of acquisition path 134 with destination path 126. If end position 134H is within a small pre-set distance from destination path 126, destination path 126 is considered acquired. Line acquisition system 112 may extend curvature profile 170 and acquisition path 134 when end position 134H is short of destination path 126. For example, line acquisition system 112 may add additional length to zero curvature profile segment 170D to increase the distance vehicle 100 travels along attack heading path 134D. For example, if end position 134H is 5 meters short of destination path 126, line acquisition system 112 may add 5 meters to curvature profile segment 170D.

When end position 134H overshoots destination path 126, line acquisition system 112 may modify the attack heading. For example, instead of producing an attack heading 172D of 90 degrees, line acquisition system 112 may generate an attack heading 172D of 80 degrees relative to destination path 126. The reduced attack heading 172D may longitudinally extend acquisition path 134 and reduce the amount of overshoot in end position 134H.

Line acquisition system 12 may vary the attack heading based on the amount of overshoot or based on preset configuration parameters. For example, line acquisition system 112 may select increasingly smaller attack headings 172D until end position 134H comes within the predetermine range of destination path 126. In one example, line acquisition system 112 may stop generating curvature profiles 170 when acquisition path 134 still does not converge with destination path 126 after a threshold number of iterations. Line acquisition system 112 then may report an acquisition error to the vehicle operator via user interface 125 in FIG. 2.

Figure 7:
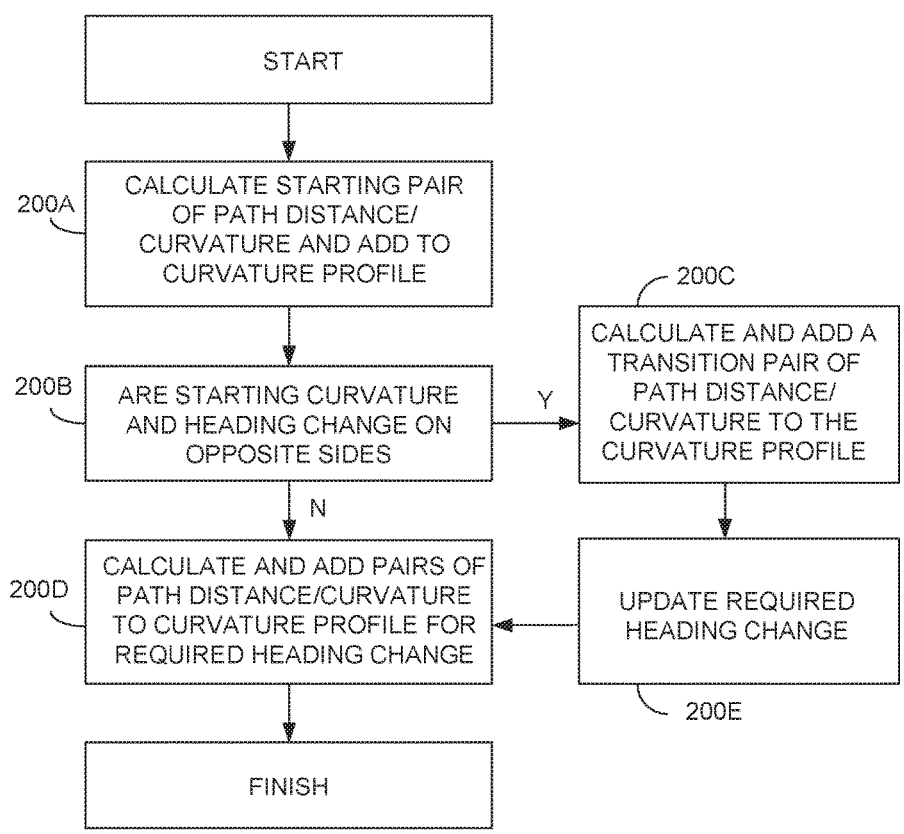
FIG. 7 shows an example process for building a curvature profile.

FIG. 7 shows an example process for building a curvature profile for a heading change. In operation 200A, line acquisition system 112 calculates a starting pair of distance and curvature values to add to the curvature profile. For example, the line acquisition system 112 may identify the starting distance and curvature of vehicle 100 from the vehicle's starting conditions.

In operation 200B, line acquisition system 112 determines if the starting curvature of vehicle 100 and the heading change are on opposite sides. For example, the vehicle may currently be turned toward the left and the necessary heading change for acquiring the destination path may be toward the right. If on opposite sides, operation 200C adds a transition segment to the curvature profile. For example, the line acquisition system may calculate a pair of path distance/curvature (curvature profile segment) that transitions from the vehicle from the current left hand curvature to a neutral zero curvature. In operation 200E, line acquisition system 112 updates the required heading change to the destination path from the new neutral heading of vehicle 100.

If the initial vehicle curvature and desired heading change are on the same side in operation 200B, line acquisition system 112 moves to operation 200D. Operation 200D calculates and adds pairs of path distance/curvatures (curvature segments) to the curvature profile for the desired heading change as described above in FIG. 6. For example, the line acquisition system may derive a set of curvature profile segments that correct for the heading error between vehicle 100 and the destination path.

Figure 8:
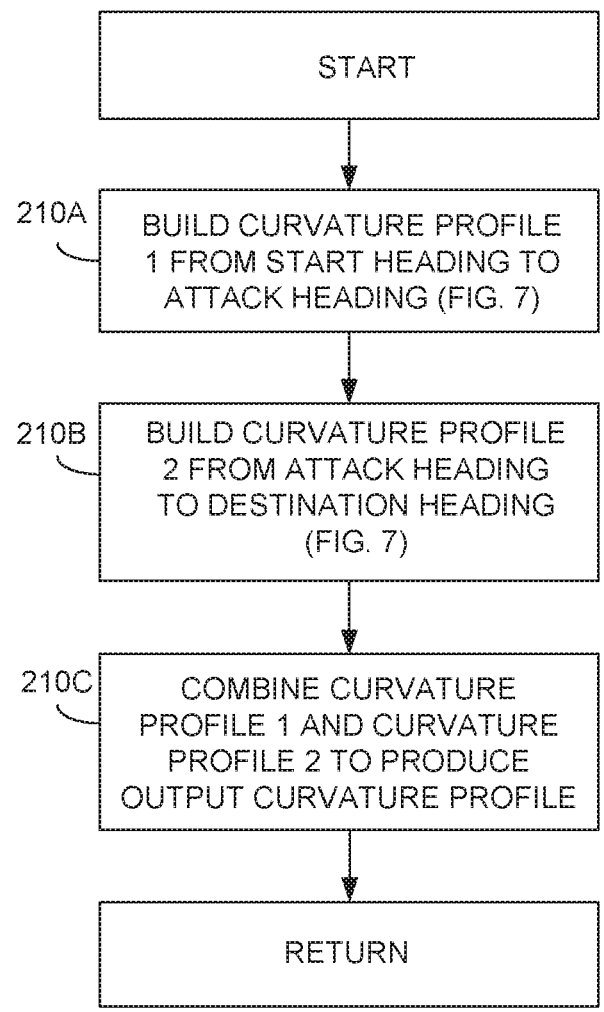
FIG. 8 shows an example process for combining different portions of a curvature profile.

FIG. 8 shows an example process for generating a complete curvature profile. Operation 210A builds a first portion of the curvature profile from the initial vehicle heading to the attacking heading as describe above in FIG. 6. As mentioned above, the line acquisition system may use an attack heading that locates the vehicle at 90 degrees towards the destination path. However, other attack heading may also be used.

Operation 210B builds a second portion of the curvature profile from the attack heading to the destination path heading as also described above in FIG. 6. For example, the line acquisition system may generate curvature profile segments that turn the vehicle from zero curvature at the attack heading to zero curvature at the destination path heading. Operation 210C combines the first portion of the curvature profile with the second portion of the curvature profile to generate an output curvature profile.

Figure 9:
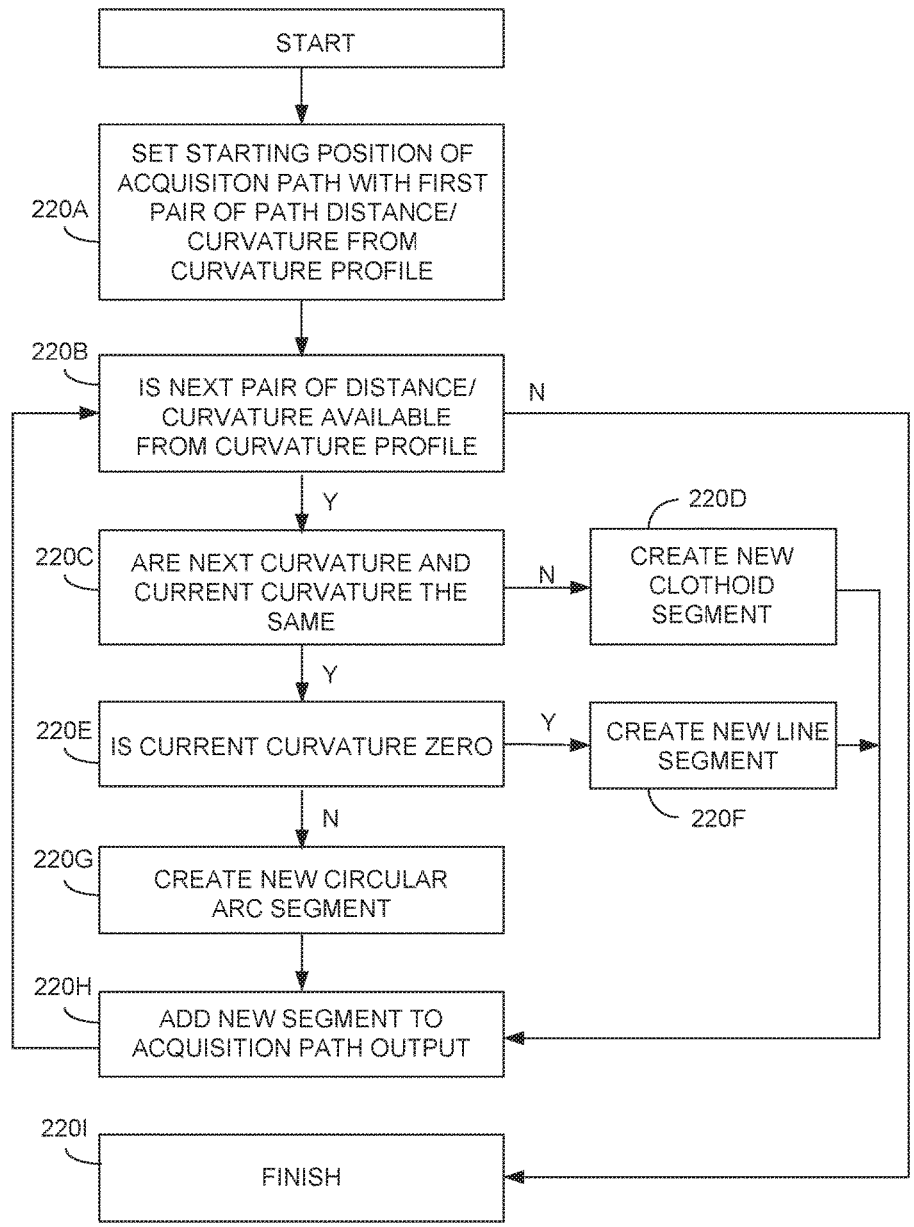
FIG. 9 shows an example process for generating an acquisition path from a curvature profile.

FIG. 9 shows an example of how the line acquisition system converts a curvature profile into an acquisition path. Operation 220A sets the starting position of the acquisition path to the first pair of path distance/curvature from the curvature profile. For example, the line acquisition system starts the acquisition path from the current position and curvature heading of the vehicle.

Operation 220B checks if the curvature profile includes a next pair of distance/curvatures. If not, acquisition path generation is finished. If the curvature profile includes a next pair of distance/curvature (curvature segment), operation 220C determines if the next curvature is the same as the previous curvature. If different curvatures, operation 220D creates a clothoid acquisition path segment. As explained above, a varying curvature along a distance graph represents a clothoid path. Operation 220D may generate the clothoid path based on the maximum curvature rate of the vehicle.

Operation 220F creates a straight line zero curvature acquisition path segment when the curvature for the next distance/curvature pair is the same as the current curvature in operation 220C and the curvature is zero in operation 220E. As shown above, a line parallel with the x-axis at zero curvature represents a straight line in the acquisition path.

If the curvature is not zero in operation 220E, operation 220G creates a next circular arc segment in the acquisition path. As also explained above, a constant non-zero curvature value parallel with the distance graph x-axis indicates a constant curvature circular path.

The line acquisition system adds the new clothoid, straight line, or circular arc segment to the acquisition path in operation 220H. Line acquisition system then jumps back to operation 220B and checks to see if a next distance/curvature pair exists in the curvature profile. If so, the line acquisition system adds a clothoid, line, or circular arc to the acquisition path based on the next curvature profile segment as described above in operations 220C-220G. Otherwise, the line acquisition system finishes the acquisition path building in operation 220I.

Figure 10:
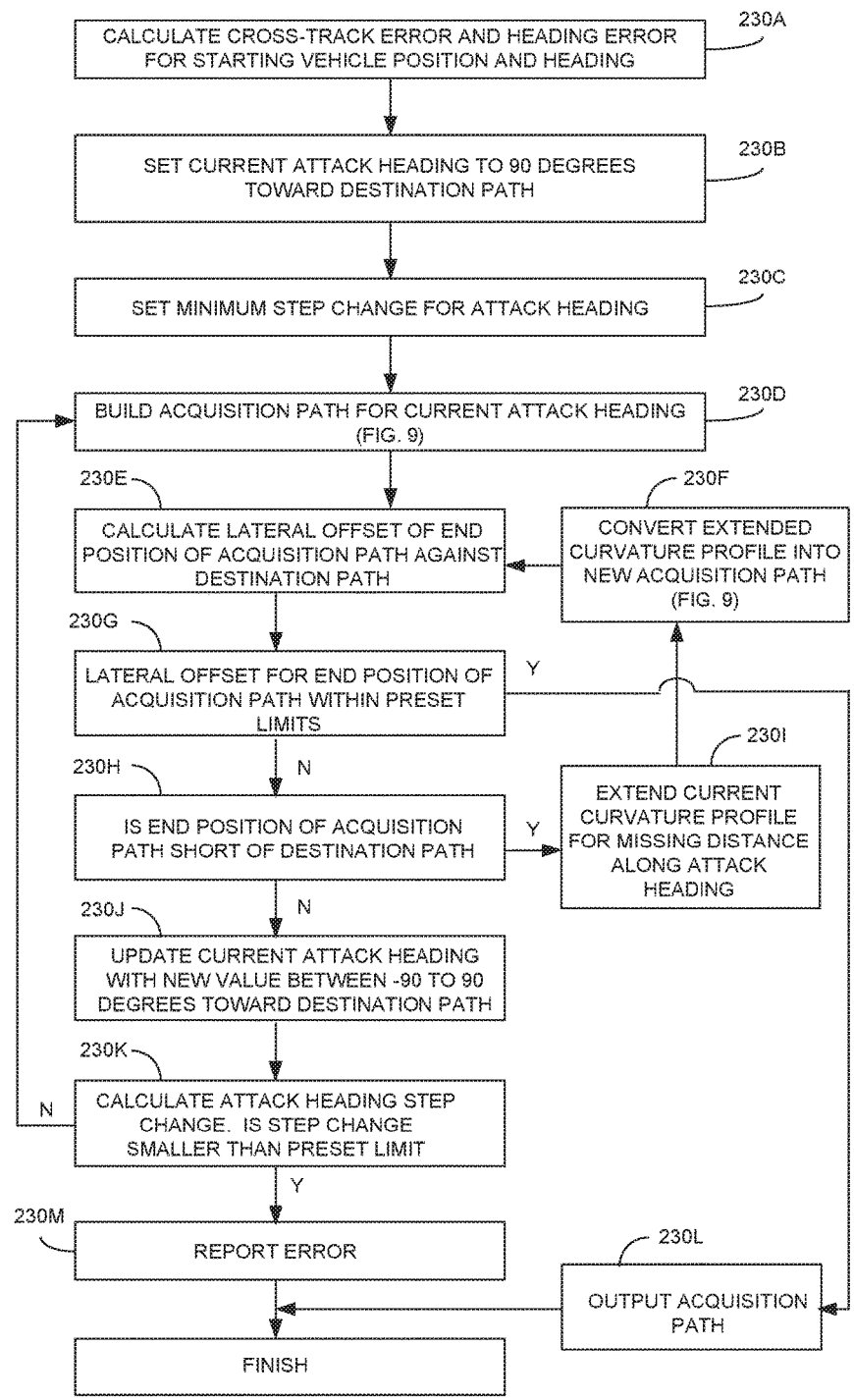
FIG. 10 shows an example process for adjusting the curvature profile to align the acquisition path with a destination path.

FIG. 10 shows an example of how the line acquisition system adjusts the line acquisition path. Operation 230A calculates the cross-track error and heading error between the starting vehicle position and the destination path. Operation 230B may set the initial attack heading to 90 degrees toward the destination path. As described above, the initial attack heading may be set to 90 degrees so the vehicle approaches the destination path as quickly as possible.

Operation 230C sets a minimum step change for the attack heading. For example, the acquisition path generated with the 90 degree attack heading may overshoot the destination path. The line acquisition system may set a minimum step change that uses a next attack heading of 85 degrees to reduce the overshoot.

Operation 230D builds the acquisition path for the current attack heading as described above in FIG. 9. Operation 230E calculates the lateral offset between the end position of the acquisition path and the destination path. In other words, the line acquisition system determines if the acquisition path merges with the destination path.

If the lateral offset is within preset limits in operation 230G, operation 230L outputs the acquisition path. For example, the line acquisition system may store the line acquisition path in memory and display the acquisition path on user interface 125 (FIG. 2).

If the lateral offset is not within the preset limits, operation 230H determines if the end position of the acquisition path is short of the destination path. If short, operation 230I extends the current curvature profile along the attack heading by an amount equal to the shortage. For example, if the end position of the acquisition path is short by 1 meter, the line acquisition system may extend the zero-curvature attack heading segment of the curvature profile by 1 meter. Operation 230F converts the extended curvature profile into a new acquisition path. The line acquisition system then jumps back to operation 230E.

The end point of the acquisition path overshoots the destination path if the endpoint is not within preset limits in operation 230G and not short of the destination path in operation 230H. If the end point of the acquisition path overshoots the destination path, operation 230J generates a new attack heading value between −90 degrees and +90 degrees towards the destination path. Operation 230K calculates the attack angle step change. For example, the line acquisition system may make iteratively smaller step changes in the attack heading for each overshoot condition.

Operation 230M reports an error to the control system when the attack heading step change is below the preset limit. For example, a small enough step change may indicate the line acquisition system cannot generate an acquisition path that converges onto the destination path. If the iteratively smaller attack heading step change is above the preset limit in operation 230K, operation 230D builds a new acquisition path for the new attack heading and repeats the operations described above.

FIGS. 11A, 11B, 12A, 12B, 13A, and 13B show example curvature profiles and associated acquisition paths generated by the line acquisition system according to the operations described above. The acquisition paths are generated from a known starting vehicle position, heading and curvature.

Figure 11A:
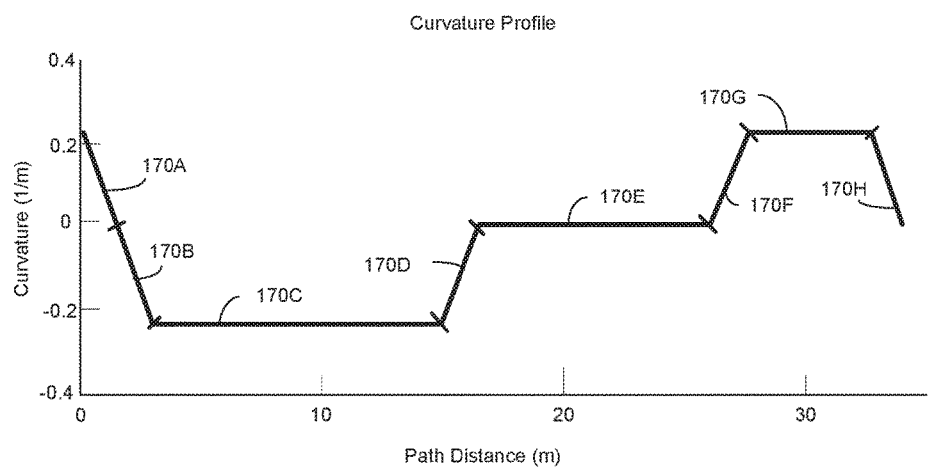
FIGS. 11A and 11B show an example curvature profile and acquisition path for an initial left vehicle curvature.
Figure 11B:
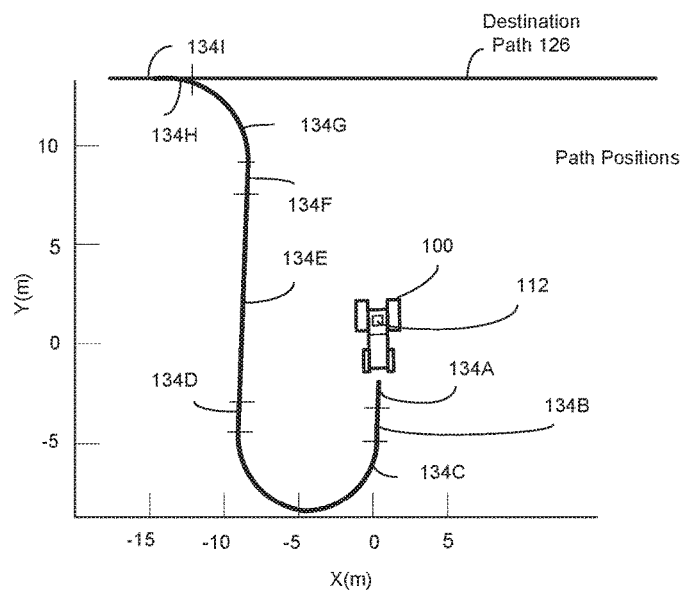

FIG. 11A shows a curvature profile 170 and FIG. 11B shows an associated acquisition path 134 for an initial vehicle curvature at a full lock left. In other words, wheels on vehicle 100 are initially turned as far as possible to the left. Line acquisition system 112 generates first curvature profile segment 170A to move vehicle 100 to a neutral zero curvature and generates second curvature profile segment 170B to change vehicle 100 to a right curvature. Curvature profile segments 170A and 170B produce clothoid sections 134A and 134B, respectively, in acquisition path 134.

Line acquisition system 112 generates a circular arc segment 170C and clothoid segment 170D that produce right turn acquisition path sections 134C and 134D, respectively. A next zero curvature profile segment 170E forms the attack heading section 134E in acquisition path 134. Left curvature profile segments 170F, 170G, and 170H form the left turn sections 134F, 134G, and 134H, respectively, of acquisition path 134. The endpoint 134I of acquisition path 134 is then at a same location and heading with destination path 126.

Figure 12A:
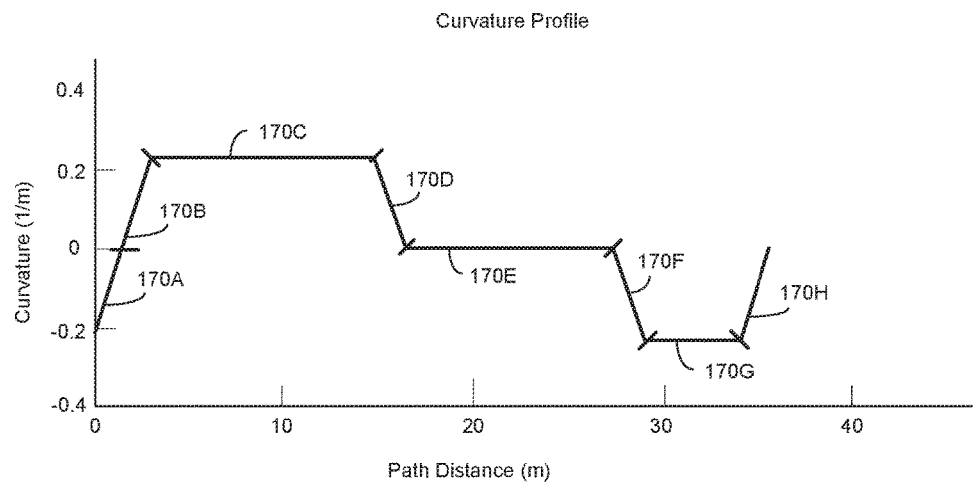
FIGS. 12A and 12B show an example curvature profile and acquisition path for an initial right vehicle curvature.
Figure 12B:
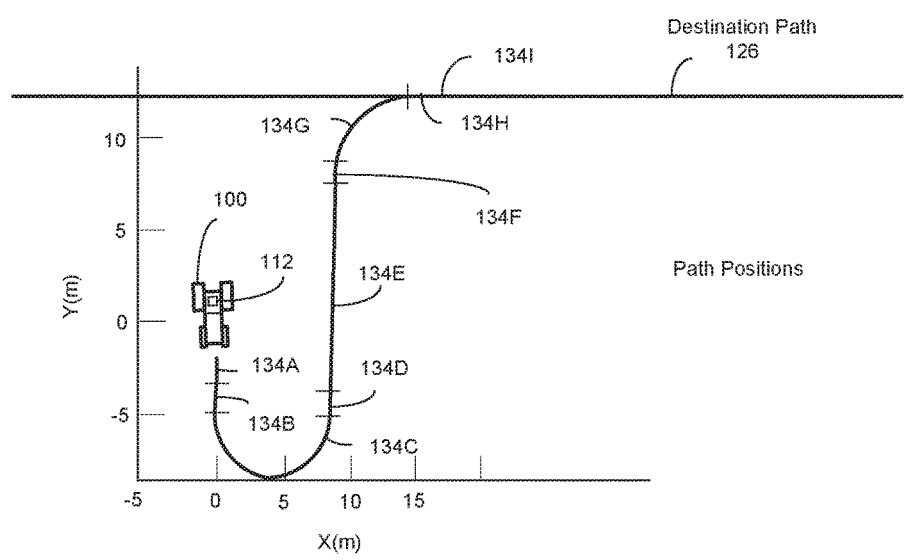

FIG. 12A shows a curvature profile 170 and FIG. 12B shows an associated acquisition path 134 where vehicle 100 starts with a full lock to the right. In other words, vehicle 100 starts with wheels turned to the right. Line acquisition system 112 generates first curvature profile segment 170A to move vehicle 100 to a zero curvature and generates second curvature profile segment 170B to change vehicle 100 to a left curvature. Curvature profile segments 170A and 170B produce clothoid path sections 134A and 134B, respectively, in acquisition path 134.

Line acquisition system 112 generates curvature profile segments 170C segment and 170D that produce left turn circular arc section 134C and clothoid section 134D, respectively. Curvature profile segment 170E forms the zero curvature attack heading section 134E towards destination path 126. Right curvature profile segments 170F, 170G, and 170H form the right turn sections 134F, 134G, and 134H, respectively, of acquisition path 134. Endpoint 134I of acquisition path 134 is then at a same location and heading with destination path 126.

Figure 13A:
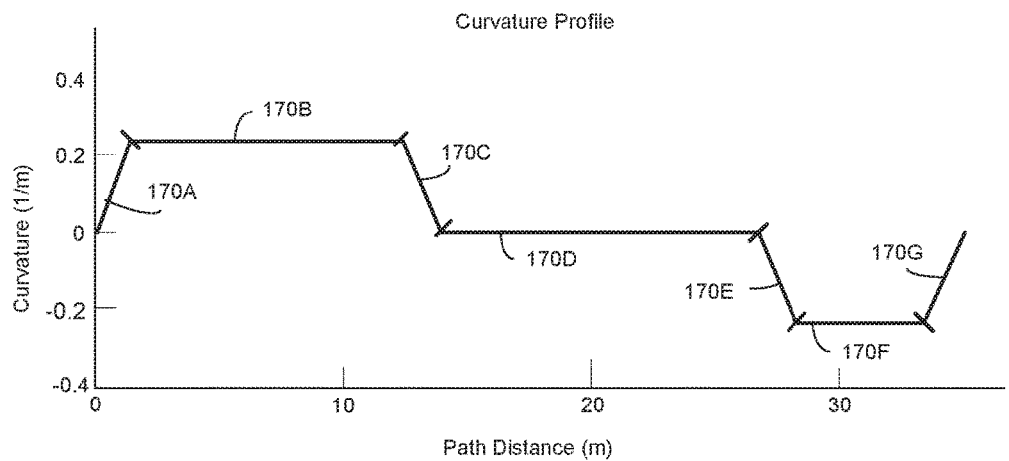
FIGS. 13A and 13B show an example curvature profile and acquisition path for an initial zero straight-ahead vehicle curvature.
Figure 13B:
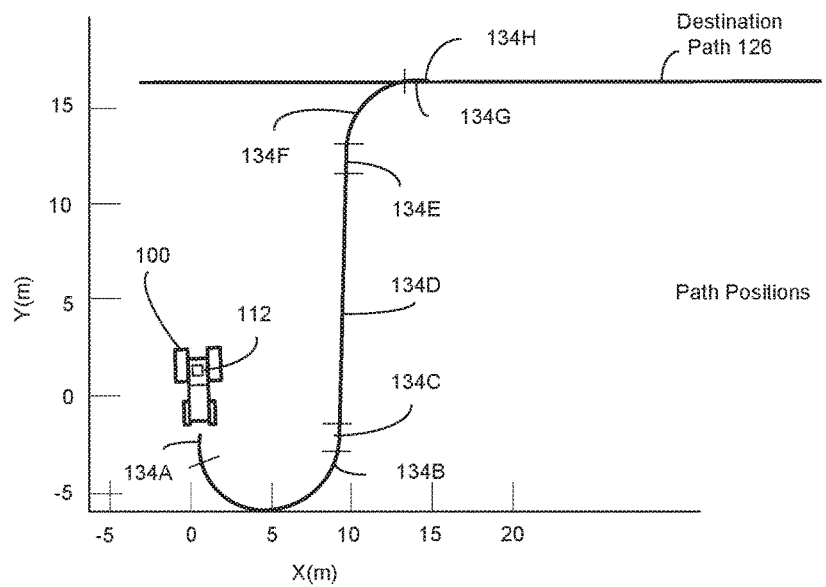
Figure 14A:
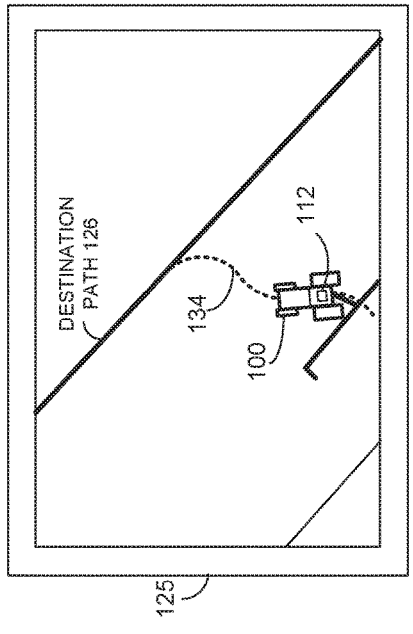
FIGS. 14A-14D show example acquisition paths generated for initial left vehicle curvature.
Figure 14B:
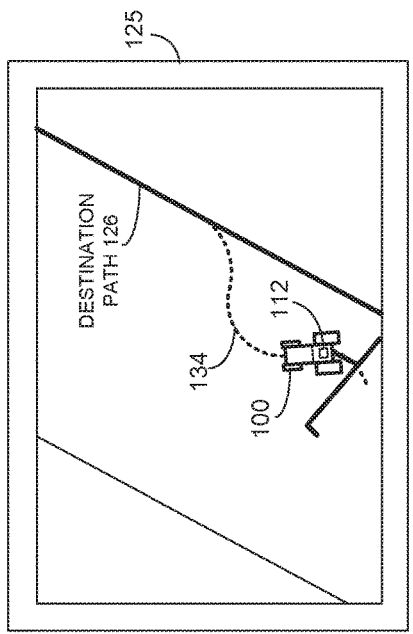
Figure 14C:
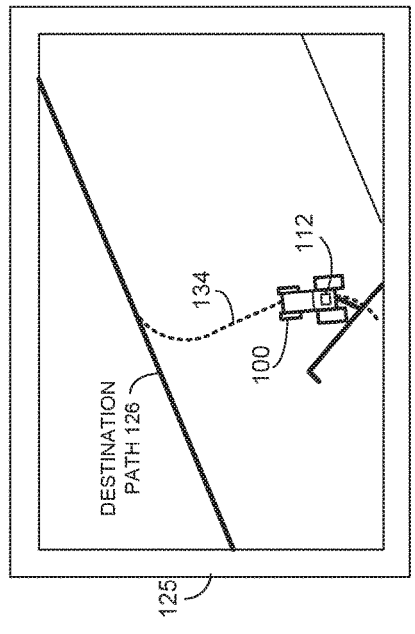
Figure 14D:
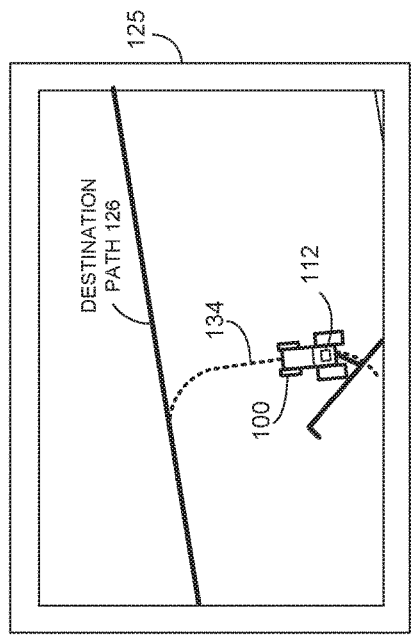
Figure 15A:
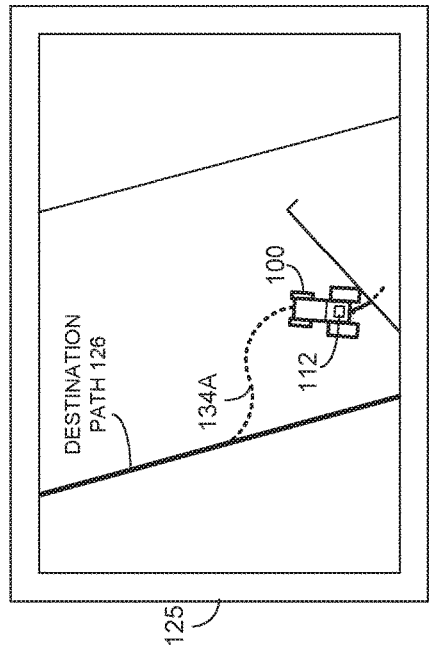
FIGS. 15A-15D show example acquisition paths generated for initial right vehicle curvature.
Figure 15B:
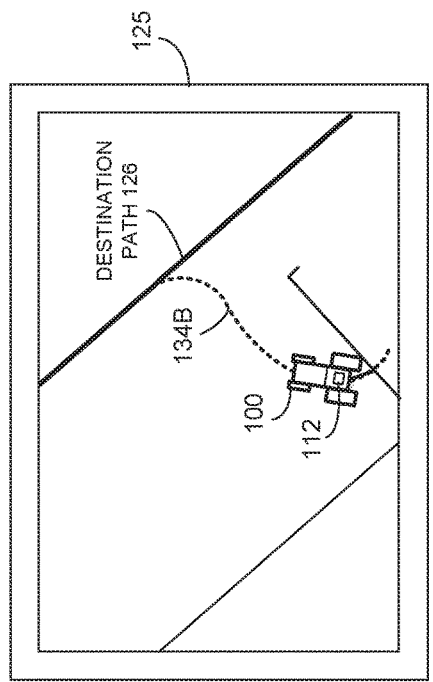
Figure 15C:
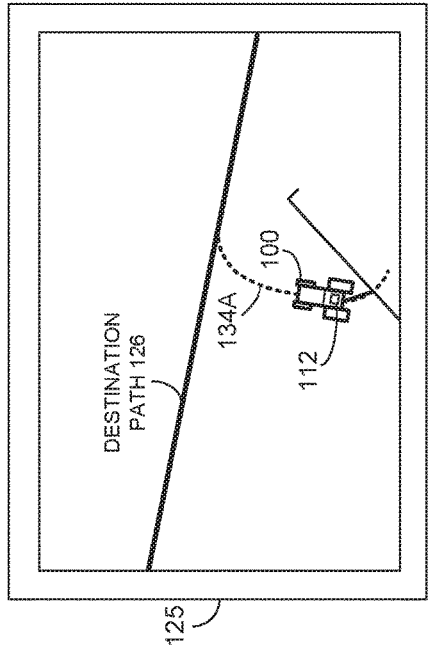
Figure 15D:
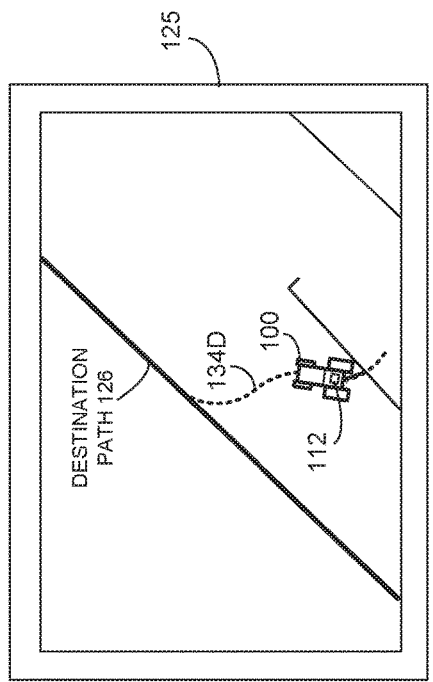

FIG. 13A shows a curvature profile 170 and FIG. 13B shows an associated acquisition path 134 for a vehicle with a zero start curvature. In other words, the wheels of vehicle 100 are initially turned straight ahead. Line acquisition system 112 generates a first curvature profile segment 170A to change vehicle 100 to a left curvature. Curvature profile segment 170A produces a clothoid section 134A in acquisition path 134.

Curvature profile segments 170B and 170C produce left circular arc section 134B and clothoid section 134C, respectively, in acquisition path 134. Curvature profile segment 170D forms the zero-curvature attack heading section 134D in acquisition path 134. Curvature profile segments 170E, 170F, and 170G form the right turn clothoid 134E, circular arc 134F, and clothoid 134G, respectively, in acquisition path 134. The endpoint 134H of acquisition path 134 is shown on a same location and heading with destination path 126.

FIGS. 14-16 illustrate various line acquisition paths generated from curvature profiles. In one example, FIGS. 14-16 represent scenarios that vehicle operator may encounter during farming operations. Vehicle 100 is at various positions and curvatures relative to destination path 126. Acquisition paths 134 are displayed on user interface 125, showing the vehicle operator the path a steering controller would use to steer vehicle 100 from a current position to reach destination path 126. The direction and shapes of acquisition paths 134 may change based on destination path orientation, vehicle position and heading relative to the destination path, and vehicle steering limits, such as maximum curvature and maximum curvature rate.

Figure 16B:
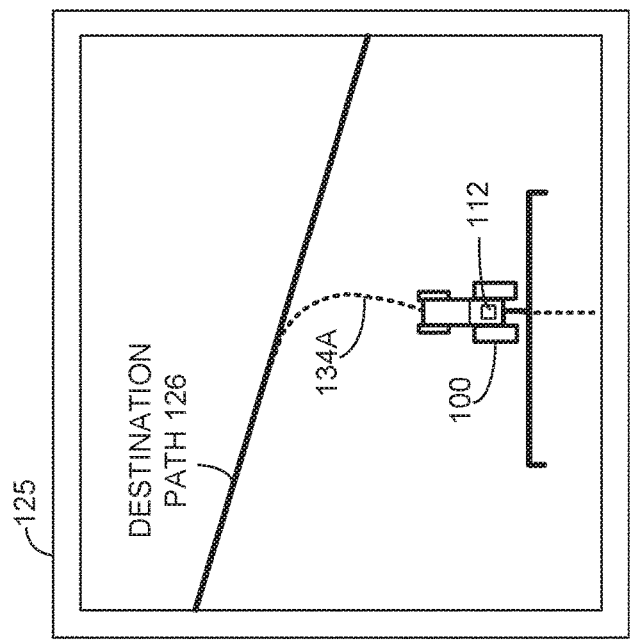
FIGS. 16A and 16B show example acquisition paths generated for initial zero vehicle curvature.
Figure 16A:
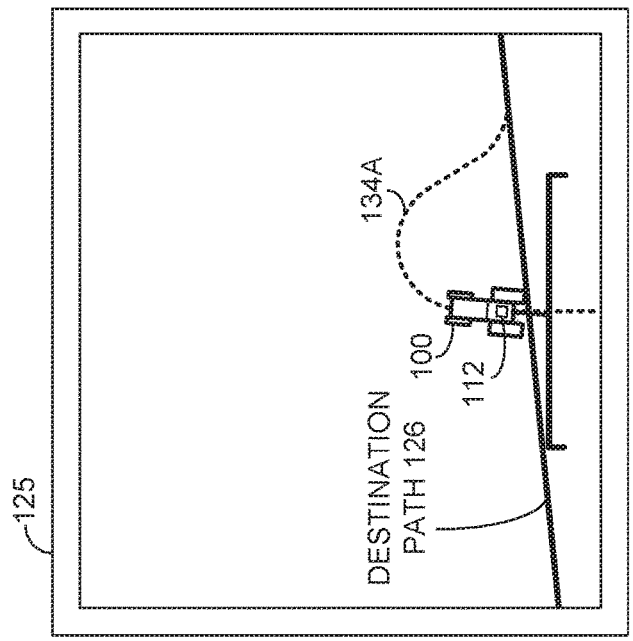

FIGS. 14A-14D show how line acquisition system 112 displays and steers vehicle 100 onto a straight line destination path 126 with a starting vehicle curvature at full lock left. FIGS. 15A-15D show how line acquisition system 112 displays and steers vehicle 100 over acquisition path 134 onto a straight line destination path 126 with a starting vehicle curvature at full lock right. FIGS. 16A and 16B show how line acquisition system 112 displays and steers vehicle 100 over acquisition path 134 onto a straight line destination path 126 with a starting zero vehicle curvature.

Figure 17:
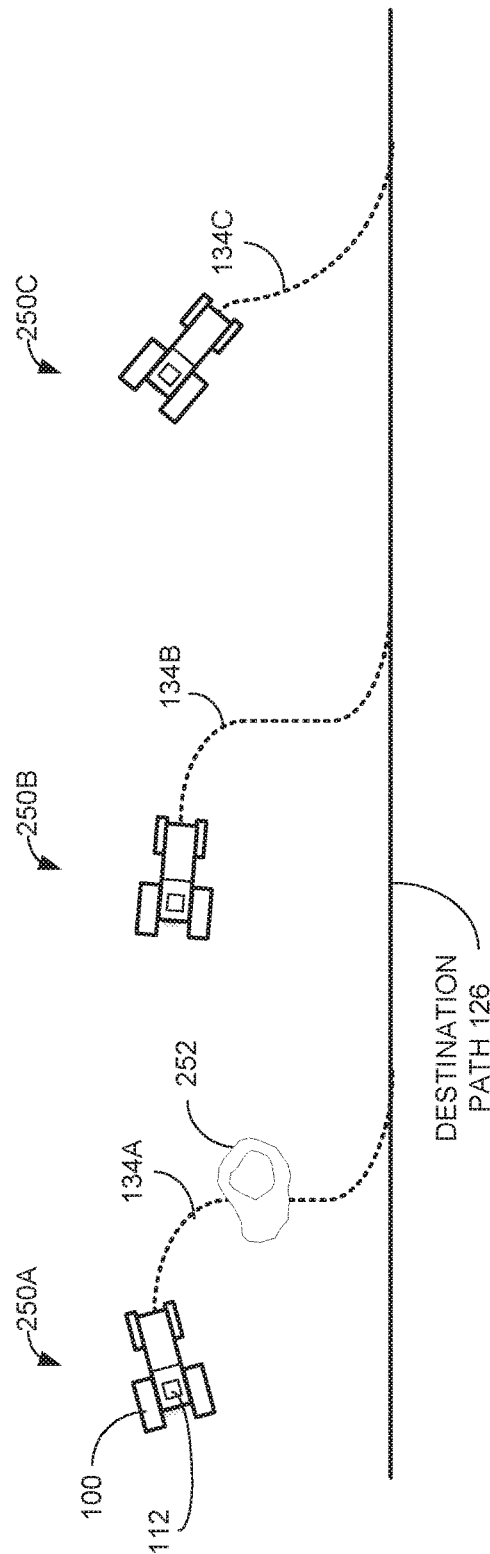
FIG. 17 shows example dynamically generated acquisition paths.

FIG. 17 shows how line acquisition system 112 automatically updates acquisition path 134. A vehicle operator may manually steer vehicle 100 into different positions 250A-250C relative to destination path 126. Line acquisition system 112 may automatically update acquisition paths 134A-134C based on current positions 250A-250C, respectively, of vehicle 100. For example, line acquisition system 112 calculates a first acquisition path 134A of vehicle 100 at a first position and heading 250A. As vehicle 100 moves from position 250A to position and heading 250B, line acquisition system 112 calculates a new acquisition path 134B. Line acquisition system 112 continuously recalculates and displays acquisition paths 134 for the new positions 250 of vehicle 100.

The vehicle operator may decide not to activate the automatic steering controller if the current acquisition path 134 would collide with an obstruction. For example, a boulder 252 may lie in acquisition path 134A. The vehicle operator may delay activating steering controller 124 (FIG. 2) and manually drive vehicle 100 to a different position 250B or 250C where boulder 252 no longer lies in the associated acquisition path 134B or 134C, respectively.

The line acquisition system uses vehicle starting states of position, heading, curvature, calibrated maximum steering curvature left/right, and steering curvature rate to generate curvature profiles and associated line acquisition paths. The line acquisition system converts the curvature profiles into primitive geometries that form acquisition paths 134 without having to use any further approximation and while meeting the vehicle steering capability.

Computer, Software, and Hardware Systems

A global navigation satellite system (GNSS) may include GPS (U.S.) Galileo (European Union, proposed) GLONASS (Russia), Beidou (China) Compass (China, proposed) IRNSS (India, proposed), QZSS (Japan, proposed) and other current and future positioning technology using signal from satellites, with or with augmentation from terrestrial sources.

Inertial navigation systems (INS) may include gyroscopic (gyro) sensors, accelerometers and similar technologies for providing outputs corresponding to the inertial of moving components in all axes, i.e., through six degrees of freedom (positive and negative directions along transverse X, longitudinal Y and vertical Z axes). Yaw, pitch and roll refer to moving component rotation about the Z, X, and Y axes respectively. Terminology may include the words specifically mentioned, derivative thereof and words of similar meaning.

Figure 18:
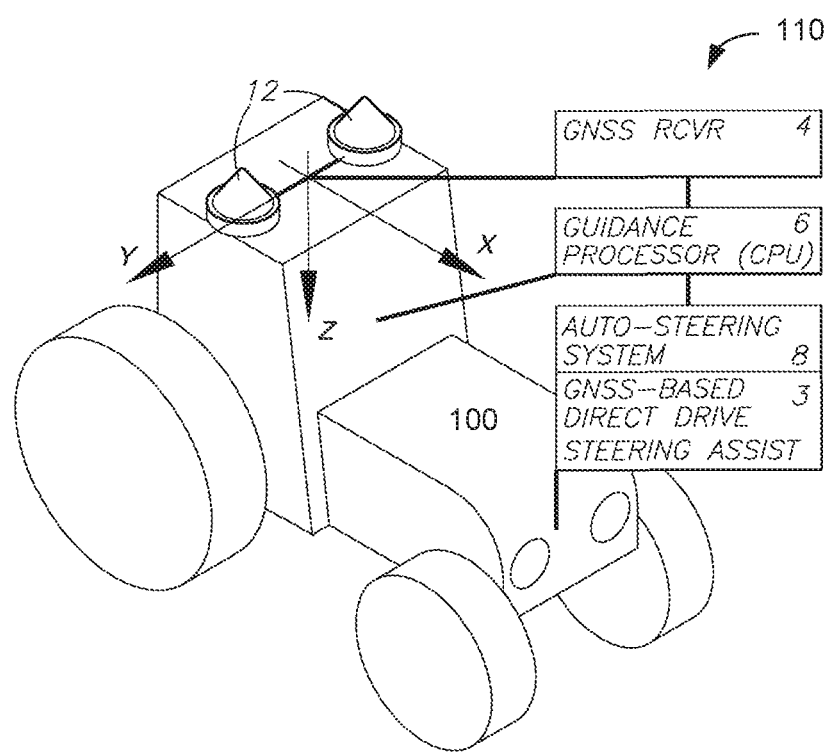
FIG. 18 shows an example guidance system that includes the line acquisition system.

FIG. 18 generally shows control system 110 used in conjunction with an electrical direct-drive steering assistance mechanism 3. Without limitation on the generality of useful applications of control system 110 may include a GNSS receiver 4, and a guidance processor 6 connected to a GNSS antenna 12 and installed into vehicle 100, such as an agricultural vehicle or tractor. An auto-steering system 8 is electrically connected to guidance processor 6, and is mechanically interfaced with vehicle 100 via steering assistance mechanism 3.

Figure 19:
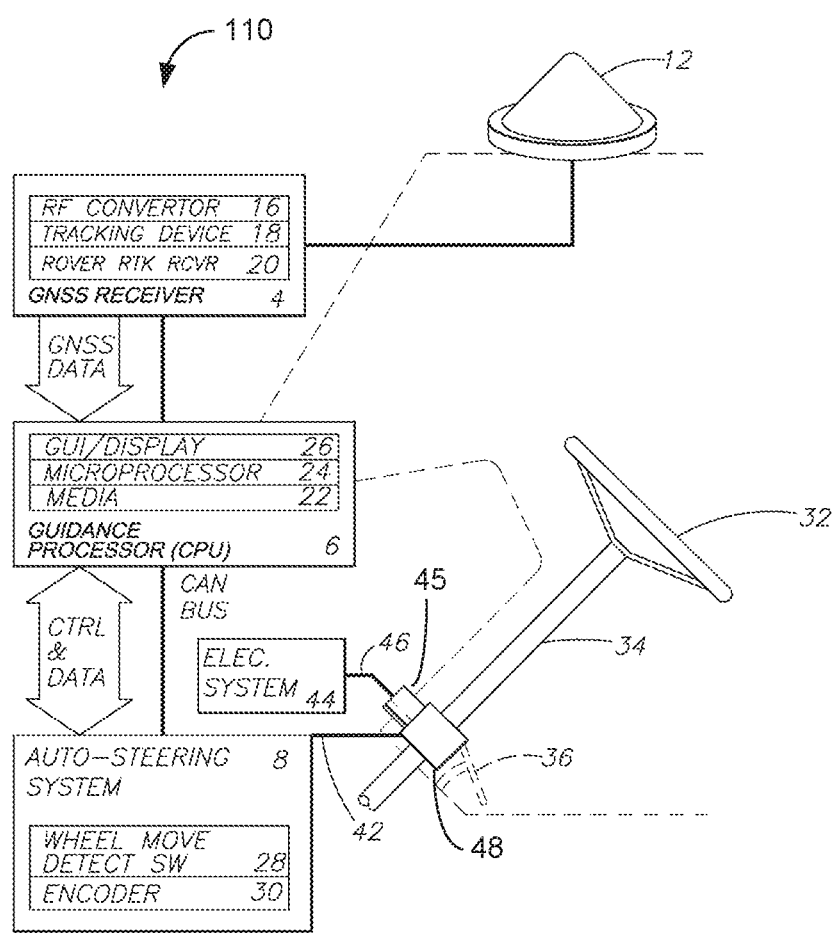
FIG. 19 shows the guidance system of FIG. 18 controlling an auto-steering system.

FIG. 19 shows additional detail of control system 110. GNSS receiver 4 is further comprised of an RF convertor (i.e., downconvertor) 16, a tracking device 18, and a rover RTK receiver element 20. The receiver 4 electrically communicates with, and provides GNSS positioning data to, guidance processor 6. Guidance processor 6 includes a graphical user interface (GUI) 26, a microprocessor 24, and a media element 22, such as a memory storage drive. Guidance processor 6 electrically communicates with, and provides control data to auto-steering system 8. Auto-steering system 8 includes a wheel movement detection switch 28 and an encoder 30 for interpreting guidance and steering commands from CPU 6.

Auto-steering system 8 may interface mechanically with the vehicle's steering column 34, which is mechanically attached to steering wheel 32. A control line 42 may transmit guidance data from the CPU 6 to auto-steering system 8. An electrical subsystem 44, which powers the electrical needs of vehicle 100, may interface directly with auto-steering system 8 through a power cable 46. Auto-steering subsystem 8 can be mounted to steering column 34 near the floor of the vehicle, and in proximity to the vehicle's control pedals 36. Alternatively, auto-steering system 8 can be mounted at other locations along steering column 34.

Auto-steering system 8 physically drives and steers vehicle 100 by actively turning the steering wheel 32 via steering column 34. A motor 45 powered by vehicle electrical subsystem 44 may power a worm drive which powers a worm gear 48 affixed to auto-steering system 8. These components are preferably enclosed in an enclosure. In other embodiments, auto-steering system 8 is integrated directly into the vehicle drive control system independently of steering column 34.

Some of the operations described above may be implemented in software and other operations may be implemented in hardware. One or more of the operations, processes, or methods described herein may be performed by an apparatus, device, or system similar to those as described herein and with reference to the illustrated figures. The computing devices described above may include any collection of devices or circuitry that individually or jointly execute a set (or multiple sets) of instructions to perform any one or more of the operations discussed above. Computing devices may be part of an integrated control system or system manager, or may be provided as a portable electronic device configured to interface with a networked system either locally or remotely via wireless transmission.

"Computer-readable storage medium" (or alternatively, "machine-readable storage medium") used in control system 110 may include any type of memory, as well as new technologies that may arise in the future, as long as they may be capable of storing digital information in the nature of a computer program or other data, at least temporarily, in such a manner that the stored information may be "read" by an appropriate processing device. The computer-readable medium may store computer instructions that are executed by a processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Examples of systems, apparatus, computer-readable storage media, and methods are provided solely to add context and aid in the understanding of the disclosed implementations. It will thus be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations. Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

What is claimed is:

1. A line acquisition system for generating an acquisition path for a vehicle, comprising:
   a hardware processor to:
   identify a destination path;
   identify a position of the vehicle;
   identify a heading error between the destination path and the vehicle;
   generate a curvature profile for turning the vehicle onto the destination path based on the heading error, the curvature profile including line segments for clothoid paths, circular arc paths, and straight line zero curvature paths; and
   generate an acquisition path from the position of the vehicle to the destination path from the clothoid path, circular arc path, and zero curvature paths identified the in the curvature profile, wherein the processor is further configured to:
   convert a current section of the curvature profile and a next section of the curvature profile with different curvatures into a clothoid section of the acquisition path,
   convert a current section of the curvature profile with a zero curvature and a next section of the curvature profile with a same zero curvature into a straight line zero curvature section of the acquisition path; and
   convert a current section of the curvature profile with a nonzero curvature and a next section of the curvature profile with a same nonzero curvature into a circular arc path section of the acquisition path.

2. The line acquisition system of claim 1, the processor further to:
   identify an end location of the acquisition path; and
   display the acquisition path on a user interface when the end location comes within the predetermine range of the destination path.

3. The line acquisition system of claim 1, wherein the processor is further to:
   repeatedly generate new curvature profiles for new positions of the vehicle;
   repeatedly generate new acquisition paths for the new curvature profiles;
   display the new acquisition paths on a user interface;
   receive an input selecting one of the new acquisition paths; and
   automatically steer the vehicle along the selected one of the new acquisition paths to the destination path.

4. The line acquisition system of claim 1, wherein the processor is further to:
   generate a line with a changing curvature value over path distance for the clothoid path segments;
   generate a line with a constant non-zero curvature value over path distance for the circular path segments; and
   generate a line with a constant zero curvature value over path distance for the zero curvature straight path segments.

5. The line acquisition system of claim 1, the processor further to:
   generate a first section of the curvature profile that moves a current heading of the vehicle to an attack heading towards the destination path; and
   generate a second section of the curvature profile that moves the vehicle from the attack heading onto the destination path.

6. The line acquisition system of claim 5, the processor further to:
   generate the first section of the curvature profile so the vehicle has zero curvature at the attack heading;
   identify an end point of the acquisition path; and
   add a zero-curvature segment between the first and second section of the curvature profile when the end point is short of the destination path.

7. The line acquisition system of claim 6, the processor further to:
   identify a lateral error between the end point of the acquisition path and the destination path; and
   use the lateral error as a path distance for the zero-curvature segment.

8. The line acquisition system of claim 5, the hardware processor further to:

reduce the attack heading when an end point of the acquisition path overshoots the destination path;

generate a new curvature profile with the reduced attack heading;

generate a new acquisition path from the new curvature profile; and repeatedly reduce the attack heading and generate new curvature profiles and new acquisition paths until the end point comes within a predetermine range of the destination path.

9. The line acquisition system of claim 8, the processor further to start with an initial attack heading of 90 degrees to the destination path.

10. A computer program for generating an acquisition path from a vehicle to a destination path, the computer program comprising a set of instructions operable to:

identify a heading error between the vehicle and the destination path;

generate a curvature profile based on the heading error that includes segments representing different vehicle curvatures over a path distance of the vehicle, the curvature profile including clothoid, circular arc, and zero curvature segments aligning the vehicle with the destination path;

generate an acquisition path based on the curvature profile; and display the acquisition path on a user interface.

11. The computer program of claim 10, wherein the instructions are further operable to:

detect a selection of the acquisition path displayed on the user interface; and automatically steer the vehicle along the acquisition path onto the destination path based on the selection.

12. The computer program of claim 10, wherein the instructions are further operable to:

generate a first segment of the curvature profile that turns the vehicle to an attack heading towards the destination path with a zero curvature; and generate a second segment of the curvature profile that turns the vehicle from the attack heading to a heading of the destination path.

13. The computer program of claim 12, wherein the instructions are further operable to insert a zero curvature segment between the first and second segment of the curvature profile when an endpoint of the acquisition path is short of the destination path.

14. The computer program of claim 12, wherein the instructions are further operable to reduce the attack heading when an endpoint of the acquisition path overshoots the acquisition path.

15. The computer program of claim 10, wherein the instructions are further operable to:

generate a first segment for the curvature profile to change the vehicle curvature to a clothoid in a first direction;

generate a second segment for the curvature profile to change the vehicle curvature to a circular arc in the first direction; and generate a third segment of the curvature profile to change the vehicle curvature to a zero curvature.

16. The computer program of claim 15, wherein the instructions are further operable to:

generate a fourth segment for the curvature profile to change the vehicle curvature to a clothoid in a second direction;

generate a fifth segment for the curvature profile to change the vehicle curvature to a circular arc in the second direction; and generate a sixth segment of the curvature profile to change the vehicle curvature to a zero curvature in a same heading as the destination path.

17. The computer program of claim 15, wherein the instructions are further operable to:

identify an initial curvature of the vehicle as being in a direction away from the required direction of acquisition; and generate an initial segment for the curvature profile before the first segment to change the initial vehicle curvature from the initial direction to a zero curvature.

18. A method for generating a curvature profile for changing a heading of a vehicle, comprising:

determining a heading error between a current heading of the vehicle and a destination path;

deriving a first portion of the curvature profile based on the heading error that turns the vehicle from the current heading to an attack heading toward the destination path;

deriving a second portion of the curvature profile that turns the vehicle from the attack heading to a heading substantially aligning with the destination path, the curvature profile including a combination of lines with: a clothoid with varying curvature values over a path distance, constant non-zero curvature over a path distance, and constant zero curvature over a path distance; and generating an acquisition path from the curvature profile.

19. The method of claim 18, including deriving the first portion and second portion of the curvature profile so an area underneath the curvature profile removes the heading error.

20. The method of claim 18, further comprising:

identifying an end point of the acquisition path;

inserting a zero-curvature segment between the first and second portion of the curvature profile when the end point is short of the destination path; and reducing the attack heading and derive new first and second portions of the curvature profile with the reduced attack heading when the end point overshoots the destination path.

* * * * *